United States Patent [19]

Aikawa et al.

[11] Patent Number: 4,700,249
[45] Date of Patent: Oct. 13, 1987

[54] MAGNETIC TRANSDUCER HEAD CAPABLE OF PROPER DATA TRANSFER CONTACT WITH A FLEXIBLE MAGNETIC DISK WITHOUT FINE ADJUSTMENT

[75] Inventors: Shinichi Aikawa, Mitaka; Hiroshi Shibuya, Kunitachi; Hideya Kato, Yamanashi; Akira Nishimoto, Tachikawa, all of Japan

[73] Assignee: Teac Corporation, Tokyo, Japan

[21] Appl. No.: 733,145

[22] Filed: May 10, 1985

[30] Foreign Application Priority Data

May 18, 1984 [JP] Japan .................................. 59-100266

[51] Int. Cl.[4] .......................... G11B 21/16; G11B 5/54
[52] U.S. Cl. ....................................... 360/104; 360/99
[58] Field of Search .................................. 360/104–105, 360/106, 97, 99

[56] References Cited

U.S. PATENT DOCUMENTS 3,678,481  7/1972  Dalziel et al. .
4,320,426  3/1982  Thompson .......................... 360/104
4,445,155  4/1984  Takahashi et al. .

*Primary Examiner*—A. J. Heinz
*Attorney, Agent, or Firm*—Woodcock Washburn Kurtz Mackiewicz & Norris

[57] ABSTRACT

A flexible magnetic disk drive is disclosed which has a transducer head requiring little or no positional or angular readjustment for proper data transfer contact with a flexible magnetic disk in the face of possible dimensional or mounting errors. The transducer head has a rounded contact surface for data transfer contact with the flexible magnetic disk, in which surface is defined a transducing gap, typically a read/write gap. The transducing gap is offset toward the axis of the magnetic disc from a notional line right angularly crossing, at the apex of the contact surface, another notional line connecting the apex of the contact surface and the center of the magnetic disk. So positioned on the contact surface, the transducing gap is practically free from the wobbling motion of that part of the rotating magnetic disk which is radially outward of its points of contact with the transducer head and with a pressure pad. The transducing gap can be arranged on the contact surface as above merely by mounting a transducer head of standard construction in a slanting attitude on a carriage which transports both the head and the pressure pad radially of the magnetic disk.

8 Claims, 6 Drawing Figures

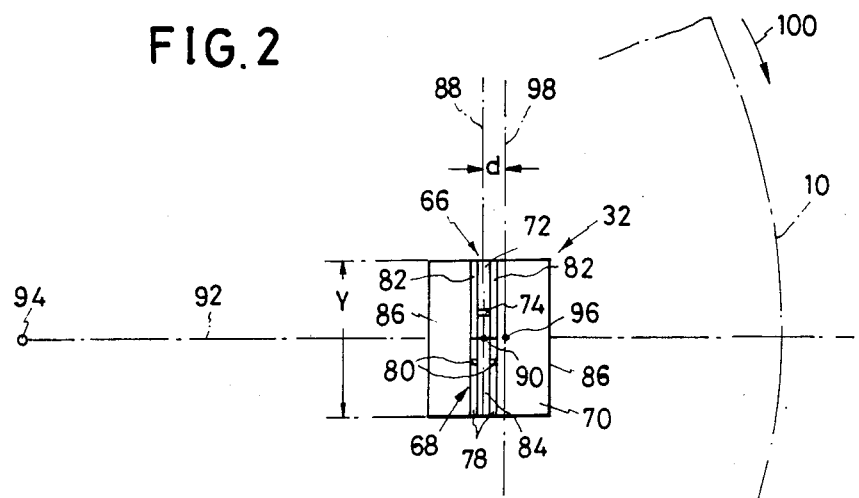

MAGNETIC TRANSDUCER HEAD CAPABLE OF PROPER DATA TRANSFER CONTACT WITH A FLEXIBLE MAGNETIC DISK WITHOUT FINE ADJUSTMENT

BACKGROUND OF THE INVENTION

Our invention relates to an apparatus for data transfer with a flexible magnetic disk commonly known as a floppy disk, and more specifically to such an apparatus, or a disk drive as the apparatus is sometimes referred to, having a transducer head constructed and arranged for the ready establishment of proper data transfer contact with the flexible magnetic disk.

The flexible magnetic disk is now unquestionably one of the most widely accepted information storage media. There have been suggested and used various types of such disks, as well as of matching disk drives, as disclosed for example in Dalziel et al. U.S. Pat. No. 3,678,481 and Takahashi et al. U.S. Pat. No. 4,445,155. The magnetic disks in current use may be broadly classified as single or double sided, depending upon whether information is stored on one or both surfaces of the disk. A disk drive for use with a single sided magnetic disk has, of course, but one magnetic transducer head for data transfer with one surface of the disk, and a pressure pad which is sprung against the other surfaces of the disk. The transducer head has a curved or rounded contact surface, for data transfer contact with the magnetic disk, having defined therein a transducing gap such as a read/write gap, perhaps together with a pair of erase transducing gaps for erasing the opposite marginal edges of a track of information on the magnetic disk for an improved track density.

Heretofore, in this type of transducer head, the read/write transducing gap has been so positioned on its contract surface as to be on a notional line passing the apex of the rounded contact surface and extending normal to the radial direction of the magnetic disk, with a view to a minimum spacing loss between the transducing gap and the disk. The spacing loss will indeed be reduced to a minimum if the transducer head is so mounted that its transducing gap is positioned on that line. In practice, however, rarely has the transducing gap been placed exactly on the line by reasons of unavoidable dimensional or mounting errors.

A conventional solution to this problem has been to employ a magnetic disk having prerecorded thereon a signal for the head alignment purpose. The head alignment signal is read out following the assemblage of the disk drive, and the angular position of the transducer head is readjusted so that the signal output may become maximum or attain some other prescribed level. We object to this solution because of the lengthy and troublesome procedure involved for the fine readjustment of the head position with respect to the magnetic disk, leading to an increase in the manufacturing cost of the disk drive.

SUMMARY OF THE INVENTION

We have found a practical solution to the problem of how to accomplish a satisfactory data transfer contact between transducer head and magnetic disk in a data transfer apparatus of the kind defined.

According to our invention, stated in brief, there is provided a data transfer apparatus for use with a flexible magnetic disk, comprising a disk drive mechanism for imparting rotation to the flexible magnetic disk in a preassigned data transfer position within the apparatus. A pressure pad and a magnetic transducer head are both mounted on a carriage, movable radially of the magnetic disk being held in the data transfer position, and are disposed on the opposite sides of the magnetic disk for slidably engaging same therebetween. The transducer head has a curved contract surface for data transfer contact with the flexible magnetic disk, in which there is defined a transducing gap which is located at a distance toward the center of the flexible magnetic disc being held in the data transfer position from a first straight line right angularly crossing, at the apex of the contact surface, a second straight line connecting the apex of the contact surface and the center of the flexible magnetic disk being held in the data transfer position.

As is well known, the flexible magnetic disk on rotation is subject to wobbling mostly at its part radially outward of its points of contact with the transducer head and with the pressure pad. Being displaced toward the center of the magnetic disk from the straight line passing the apex of the contact surface of the transducer head in a direction at right angles with the radial direction of the magnetic disk, the transducing gap in the contact surface of the transducer head in accordance with our invention is far less affected by the wobbling motion of the rotating magnetic disk than if the transducing gap were displaced radially outwardly of the straight line. Consequently, the transducer head will make satisfactory data transfer contact with the magnetic disk with little or no adjustment of the position or attitude of the head with respect to the disk.

Preferably, the transducer head is per of the same construction, and of the same gap arrangement, as the conventional one. The transducing gap can be disposed on the contact surface as above merely by mounting the transducer head of the standard configuration in a slanting attitude on the carriage.

The transducing gap may be spaced approximately 0.3 millimeter from the noted line passing the apex of the contact surface of the transducer head. Generally, we recommend that this spacing be made greater than, but preferably as close as possible to, the maximal possible displacement of the transducing gap from its intended position due to manufacturing and mounting errors. The transducer head will then make more or less proper data transfer contact with the magnetic disk merely by being mounted in the slanting attitude on the carriage.

The above and other features and advantages of our invention and the manner of realizing them will become more apparent, and the invention itself will best be understood, from a study of the following description and appended claims, with reference had to the attached drawings showing a preferred embodiment of our invention.

BRIEF DESCRIPTION OF THE DRAWINGS

FIG. 2 is an enlarged top plan of the magnetic transducer head in the data transfer apparatus of FIG. 1, showing its contact surface and the arrangement of the read/write and erase transducing gaps thereon;

FIG. 3 is a fragmentary vertical section, partly in elevation, of the transducer head and of its mounting means on the carriage;

FIG. 4 is a right hand side elevation, partly sectioned for clarity, of the transducer head of FIGS. 2 and 3;

DESCRIPTION OF THE PREFERRED EMBODIMENT

Figure 1:
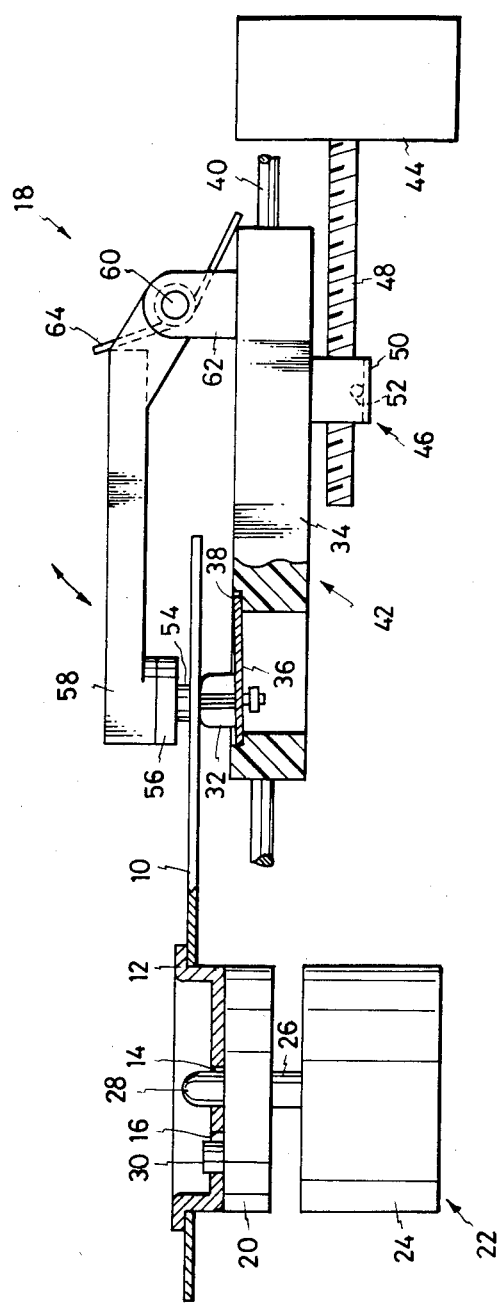
FIG. 1 is a fragmentary elevation, partly sectioned for clarity, of the essential parts of the data transfer apparatus constructed in accordance with our invention, shown together with the flexible magnetic disk mounted in position therein.

We will now describe the data transfer apparatus of our invention as adapted for use with the flexible magnetic disk cassette described and claimed in the aforesaid U.S. Pat. No. 4,445,155 to Takahashi et al. The representative disk cassette has a single sided, flexible magnetic disk with a diameter of approximately 3.5 inches (86 millimeters), which is somewhat loosely enclosed in a protective envelope for rotation therein. We have shown in FIG. 1 only the flexible magnetic disk 10 of this disk cassette, the protective envelope therefor having no direct pertinence to our invention. The magnetic disk 10 has a hub 12 of ferromagnetic material attached centrally thereto. The hub 12 has a central opening 14 and an eccentric opening 16 defined therein. Reference may be had to U.S. Pat. No. 4,445,155 for further details in the construction of the disk cassette.

FIG. 1 also shows the essential parts of the data transfer apparatus 18 in accordance with our invention, with the flexible magnetic disk 10 mounted in a preassigned data transfer position therein. The data transfer position is on a turntable 20 of a disk drive mechanism 22. This disk drive mechanism further comprises a disk drive motor 24 having an output shaft 26 directly and coaxially coupled to the turntable 20 for imparting rotation thereto. The motor output shaft 26 partly projects upwardly of the turntable 20 to provide a spindle 28 for centering engagement in the central opening 14 in the hub 12 of the magnetic disk 10. A drive pin 30 is erected eccentrically on the turntable 20 for driving engagement in the eccentric opening 16 in the disk hub 12. The turntable 20 is further provided with a permanent magnet, not shown, for attracting the disk hub 12 of ferromagnetic material. Thus, as the turntable 20 rotates with the disk drive motor 24, so does the magnetic disk 10 mounted concentrically thereon via the hub 12.

At 32 in FIG. 1 is shown a magnetic transducer head constituting the gist of our invention. The transducer head 32 is mounted on a carriage 34, which can be of plastic material, via a head mount 36 for sliding engagement with the lower surface of the magnetic disk 10 being held in the data transfer position. Preferably, and as shown, the head mount 36 is a piece of sheet metal. The head mounting plate 36 is placed on a recessed, sloping seat 38 on the top of the carriage 34. The transducer head 32 stands uprightly or in a nonsloping attitude on the mounting plate 36. However, as the mounting plate rests on the sloping seat 38, the transducer head 32 gains a sloping attitude with respect to the plane of the magnetic disk 10 in the data transfer position, the head being inclined radially inwardly of the magnetic disk. An adhesive may be used for securing the head mounting plate 36 to the seat 38. We will later describe the construction of the transducer head 32 in more detail.

Mounted on a pair of guide rods 40, one seen, for sliding motion thereon in a radial direction of the magnetic disk 10, the carriage 34 constitutes a part of a head transport mechanism 42 for transporting the transducer head 32 with respect to the magnetic disk 10 for track to track accessing. The head transport mechanism 42 further includes a head transport motor 44 of the electrical stepping type which is coupled to the carriage 34 via a rotary to linear converter 46. The converter 46 is herein shown as a worm and ball nut assembly, comprising a worm 48 and a ball nut 50 in threaded engagement with each other via balls 52. We could, of course, employ other types of rotary to linear converters such as, for instance, a familiar steel belt wound into the approximate shape of the Greek alpha.

A pressure pad 54 of felt or like material is disposed in vertical register with the transducer head 32 for sliding engagement with the upper surface of the magnetic disk 10 in the data transfer position and hence for allowing the magnetic head to make data transfer contact with the lower surface of the magnetic disk. The pressure pad 54 is mounted via a mount 56 to the distal end of a support arm 58 which is proximally pivoted at 60 to a column 62 on the carriage 34, so that the pressure pad is movable into and out of contact with the magnetic disk 10. Coiled around the pivot pin 60 of the support arm 58, a torsion spring 64 biases the support arm in a counterclckwise direction, as viewed in FIG. 1, thereby urging the pressure pad 54 against the magnetic disk 10.

FIGS. 2, 3 and 4 are more detailed representations of the magnetic transducer head 32. As will be noted from these figures, the transducer head 32 of this particular embodiment is shown as an integral assembly of a read/write head portion 66 for reading and/or writing a track of information on the magnetic disk 10, and a tunnel erase head portion 68 for tunnel erasing the edges of the newly written track after it is written. The read/write head portion 66 and tunnel erase head portion 68 have a common contact surface 70 for data transducing contact with the lower surface of the magnetic disk 10 being held in the data transfer position of FIG. 1. We recommend that this contact surface be shaped like part of a sphere having a radius of curvature of approximately 60 millimeters.

The read/write portion 66 comprises a magnetic core 72 having a transducing gap 74 in the contact surface 70, and a coil 76 disposed around a leg portion of the read/write core 72. The erase head portion 68 comprises a pair of magnetic cores 78 each having a transducing gap 80 in the contact surface 70, and a single coil 81 disposed over the leg portions of the erase cores 78. A pair of nonmagnetic spacers 82 are disposed on both sides of the read/write core 72, and another nonmagnetic spacer 84 is disposed between the pair of erase cores 78. A pair of outriggers 86 of nonmagnetic material, preferably a ceramic, are disposed on opposite sides of the cores 72 and 78 and spacers 82 and 84. The magnetic cores 72 and 78, nonmagnetic spacers 82 and 84, and nonmagnetic outriggers 86 are joined to one another via layers of an adhesive, not shown, into an integral body having the contact surface 70 directed approximately upwardly.

The pair of nonmagnetic spacers 82 of the transducer head 32 are of the same thickness, and so are the pair of nonmagnetic outriggers 86. Thus, as indicated in FIG. 2, the read/write transducing gap 74 lies on a notional straight line 88 passing the geometrical center 90 of the contact surface 70 and extending normal to a notional straight line 92 connecting the contact surface center 90 and the axis 94 of the magnetic disk 10 in the data transfer position of FIG. 1. However, since the transducer head 32 is inclined as aforesaid toward the axis of the magnetic disk 10, the apex 96 of the contact surface 70 is displaced radially outwardly from its geometrical center 90 with respect to the magnetic disk. By the "apex" 96 of the transducer head contact surface 70 we mean the highest point of the contact surface where it comes closest to the plane of the magnetic disk 10 being held in the data transfer position.

Before proceeding further with the description of our invention, we must point out that we have exaggerated in FIGS. 2 and 3 the degree of displacement of the contact surface apex 96 from its geometrical center 90. We have also exaggerated in FIG. 3 the angle of inclination of the transducer head 32 and of its mounting plate 36 with respect to the carriage 34. While these exaggerations are mainly for illustrative convenience, we believe that they better serve the purpose of illustrating the principles of our invention.

According to our invention, taken in its broader aspect, the position of the read/write transducing gap 74 is displaced a distance d toward the axis 94 of the magnetic disk 10 from a notional straight line 98 passing the apex 96 of the transducer head contact surface 70 and extending at right angles with the line 92 connecting the disk axis 94 and the geometrical center 90 of the transducer head contact surface. Furthermore, with respect to the direction of rotation of the magnetic disk 10 indicated by the arrow 100 in FIG. 2, the read/write transducing gap 74 is located upstream of the line 92. The read/write core 72 is oriented parallel to the lines 88 and 98.

We specify as follows the preferred dimensions of the transducer head 32 by way of reference:
The width x of the head 32: 4 millimeters,
The length y of the head 32: 5 millimeters,
The width of the read/write gap 74: 0.24 millimeter,
The displacement d of the read/write gap 74 from the line 98: 0.3 millimeter.

Of particular pertinence to our invention is, of course, the displacement d of the read/write transducing gap 74 from the line 98. Generally, the displacement d should be not less than the maximum possible displacement of the read/write transducing gap 74 that may occur by reasons of manufacturing and mounting errors. A recommended range of the displacement d is from 0.1 to 1.0 millimeter.

The angle $\theta$ of inclination of the head mounting plate 36 relative to the plane of the magnetic disk 10 being held in the data transfer position is approximately 17 minutes. We have mentioned that the contact surface 70 of the transducer head 32 is shaped like part of a sphere having a radius of 60 millimeters. With this transducer head contact surface 70 in data transfer contact with the magnetic disk 10, its apex 96 will project approximately 0.15 millimeter above the normal plane of the lower surface of the disk. The difference in height between the apex 12 and read/write transducing gap 74 of the transducer head contact surface 70 is from one to 10 microns for the best results.

Advantageously, the transducer head 32 can be of exactly the same construction as the standard magnetic head for use with single sided magnetic disks. The contact surface of such a standard magnetic head is formed by grinding to a specified radius of curvature, with the preformed undersides 102, FIG. 3, of the pair of outriggers 86 of the head held against a stationary surface. The read/write transducing gap of the standard head lies on the line 88 extending through the geometrical center of its contact surface and at right angles with the line 92, just as in the case of the transducer head 32 we have employed in this embodiment of our invention. The manufacture of the transducer head 32 is therefore absolutely no more difficult than the conventional one, all that is required being to mount the head on the carriage 34 at the prescribed angle relative to the plane of the magnetic disk 10 being held in the data transfer position.

As will be seen by referring back to FIG. 1, the pressure pad 54 is so arranged that its geometrical center is approximately in register with the geometrical center 90 of the transducer head contact surface 70. This arrangement is only optional, however. If the pressure pad is sufficiently large in comparison with the transducer head 32, the geometrical center of the pressure pad may be placed in register with the apex 96 of the transducer head. As an additional alternative, the geometrical center of the pressure pad may be aligned with the read/write transducing gap 74 for an optimum read/write transducing relation of the head with the magnetic disk 10, at the sacrifice of the erase transducing relation therebetween.

OPERATION

We have shown in FIG. 1 the data transfer apparatus 18 in the act of data transfer with the flexible magnetic disk 10, the latter being held in the data transfer position on the turntable 20 for joint rotation therewith, with the opposite faces of the magnetic disk slidably engaged with the transducer head 32 and with the pressure pad 56. The transducer head 32 is held against the magnetic disk 10 under pressure as the pressure pad 56 presses the disk against the head under the force of the torsion spring 64.

Figure 5:
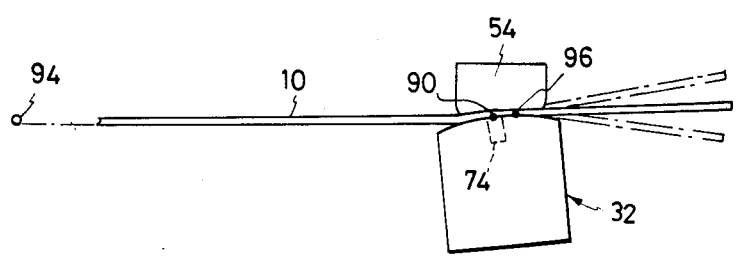
FIG. 5 is explanatory of the way the transducer head makes data transfer contact with the magnetic disk in the apparatus of FIG. 1, as seen in the same direction as in FIGS. 1 or 3.
Figure 6:
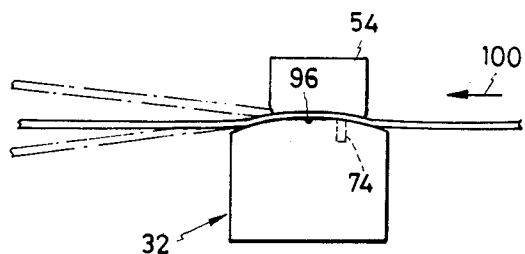
FIG. 6 is also explanatory of the way the transducer head makes data transfer contact with the magnetic disk, as seen from the right hand side of FIG. 5.

FIGS. 5 and 6 illustrate the usual wobbling motion of the magnetic disk 10 revolving in sliding engagements between transducer head 32 and pressure pad 54. As will be understood from FIG. 5, the magnetic disk 10 wobbles at its portion radially outwardly of its point of contact with the apex 96 of the transducer head contact surface 70. No satisfactory data transfer would therefore be possible because of the spacing loss if the read/write transducing gap 74 were held against such wobbling part of the magnetic disk 10. Being displaced toward the axis 94 of the magnetic disk 10 from the transducer head contact surface apex 96 in accordance with our invention, the read/write transducing gap 74 is substantially totally unaffected by such wobbling motion of the magnetic disk 10.

Admittedly, the ideal position for the read/write transducing gap 74 is on the line 898, FIG. 2, passing the apex 96 of the transducer head contact surface 70 in a right angular relation with the line 92. Experiment has proved, however, that the data transfer relation between magnetic disk 10 and transducer head 32 is nearly as favorable if, as taught by our invention, the transducer gap 74 is located inwardly of the line 98, as when it is positioned on that line. We have stated that the distance d, FIGS. 2 and 3, between read/write transducing gap 74 and line 98 should be not less than the maximal expected displacement of the transducing gap from its specified position due to manufacturing and mounting errors. Then, even in the event of the maximum displacement placement due to manufacturing and mounting errors, the read/write transducing gap 74 will not be positioned outwardly of the line 98, where the gap would be subject to the wobbling motion of the magnetic disk 10. It is thus seen that the improved data transfer apparatus 18 in accordance with our invention requires no fine readjustment of the gap position following the mounting of the transducer head 32 on the carriage 34 via the head mount 36 for the establishment of satisfactory data transfer engagement between magnetic disk 10 and transducer head 32.

We have further specified the position of the read/write transducing gap 74 as being upstream or ahead of the line 92, FIG. 2, with respect to the direction of rotation of the magnetic disk 10, also indicated in FIG. 2 by the arrow 100. As clearly pictured in FIG. 6, the magnetic disk 10, rotating in the direction of the arrow 100, wobbles significantly more at its portion behind the transducer head contact surface apex 96 than at its portion ahead of same. The read/write transducing gap 74 is therefore less affected by such wobbling motion in the rotative direction of the magnetic disk 10.

POSSIBLE MODIFICATIONS

Although we have shown and described our invention in terms of but one embodiment thereof, we recognize that our invention could be embodied in other forms within the broad teaching hereof. Obviously, then, a variety of modifications of the illustrated embodiment will occur to one skilled in the art without departing from the scope of our invention. The following is a brief list of such possible modifications:

1. The contact surface of the transducer head need not be shaped like part of a sphere but may be in the shape of, for example, a combination of parts of two or more spheres of different radii, all that is required being that the contact surface have a predetermined apex offset from the transducing gap in a radially outward direction of the magnetic disk.

2. The transducer head 32 may be mounted uprightly, instead of aslantly as in the illustrated embodiment, on the carriage 34, and this carriage may be disposed in a slanting attitude on the guide rods 40 with respect to the plane of the magnetic disk 10 being held in the data transfer position.

3. The use of the standard transducer head 32 is preferred but not mandatory; it may be replaced by one that has been designed specially for the practice of our invention, having a transducing gap offset from the geometrical center of its contact surface, such a special transducer head being mounted on the carriage in a nonslanting attitude.

4. The read/write transducing gap 74 could be disposed on the line 92 passing the apex 96 of the transducer head contact surface 70 and the axis 94 of the magnetic disk 10 being held in the data transfer position.

It will also be understood that, aside from the above and other possible modifications of the illustrated embodiment, our invention is applicable to a variety of other disk drives, such as those intended for use with three inch or 5.25 inch floppy disks. Our invention is further adaptable for various types of magnetic transducer heads other than that disclosed herein, such as that designed for the creation of a track of information having a width of 0.117 millimeter. Another example of magnetic head is the so called button head, having magnetic cores in a buttonlike plastic molding with a circular contact surface.

We claim:

1. An apparatus for data transfer with a flexible magnetic disk rotating in a predetermined direction about a predetermined axis and having a normal plane of rotation, comprising:
    (a) a disk drive mechanism for imparting rotation to the disk;
    (b) a carriage movable radially of the disk;
    (c) a pressure pad disposed on one side of the disk and mounted on the carriage for movement therewith radially of the disk, the pressure pad being biased into sliding engagement with the disk; and
    (d) a magnetic transducer head also mounted on the carriage and disposed opposite the pressure pad for slidably engaging the disk therebetween, the transducer head having a spherical contact surface with a transducing gap defined therein for data transfer with the flexible magnetic disk, the contact surface having an apex where it is closest to the flexible magnetic disk, the transducing gap being displaced a prescribed distance toward the axis of the disk from a first straight line which extends through the apex of the contact surface in a plane parallel to a plane of a normal, undistorted disk and which right angularly crosses a second straight line connecting the apex of the contact surface and the axis of the disk, the transducing gap being further located upstream of the second straight line with respect to the predetermined direction of rotation of the disk.

2. The data transfer apparatus as set forth in claim 1, wherein the prescribed distance is from 0.1 to 1.0 millimeter.

3. The data transfer apparatus as set forth in claim 1, wherein the transducing gap of the magnetic transducer head is a read/write transducing gap, and wherein the transducer head further has a pair of erase transducing gap defined in its contact surface.

4. The data transfer apparatus as set forth in claim 1, wherein the transducing gap is located at a midpoint of the contact surface in a direction parallel to the second straight line, and wherein the head is mounted on the carriage in such a slanting attitude with respect to the normal plane of the disk that the transducing gap is displaced toward the axis of the magnetic disk from the first straight line.

5. The data transfer apparatus as set forth in claim 4, wherein the angle of inclination of the transducer head with respect to the plane of the flexible magnetic disk being held in the data transfer position is approximately 17 minutes.

6. The data transfer apparatus as set forth in claim 4, further comprising a head mount through which the magnetic transducer head is mounted on the carriage, the head being mounted in a nonslanting attitude on the head mount, the head mount being mounted on the carriage at such an angle to the normal plane of the disk that the head acquires the slanting attitude.

7. The data transfer apparatus as set forth in claim 6, wherein the head mount is in the form of a plate.

8. The data transfer apparatus as set forth in claim 7, wherein the carriage has formed thereon a sloping seat on which the head mount rests for holding the transducer head in the slanting attitude.

* * * * *

UNITED STATES PATENT AND TRADEMARK OFFICE
CERTIFICATE OF CORRECTION

PATENT NO. : 4,700,249

DATED : October 13, 1987

INVENTOR(S) : Shinichi Aikawa et al.

It is certified that error appears in the above-identified patent and that said Letters Patent is hereby corrected as shown below:

Column 1, line 27, after "other", delete "surfaces" and substitute therefor --surface--;

Column 2, line 33, after "per", insert --se--;

Column 4, line 47, after "read/write", insert --head--;

Column 6, line 42, after "sliding", delete "engagements" and substitute therefor --engagement--;

Column 6, line 57, after "line", delete "898" and substitute therefor --98--;

Column 6, line 62 and 63, after "the" on line 62, delete "transducer" and substitute therefor --transducing--.

Signed and Sealed this

First Day of March, 1988

Attest:

DONALD J. QUIGG

*Attesting Officer*     *Commissioner of Patents and Trademarks*